July 21, 1936.  G. KRANZ  2,048,611
ADJUSTABLE OUTLET BOX
Filed June 8, 1934
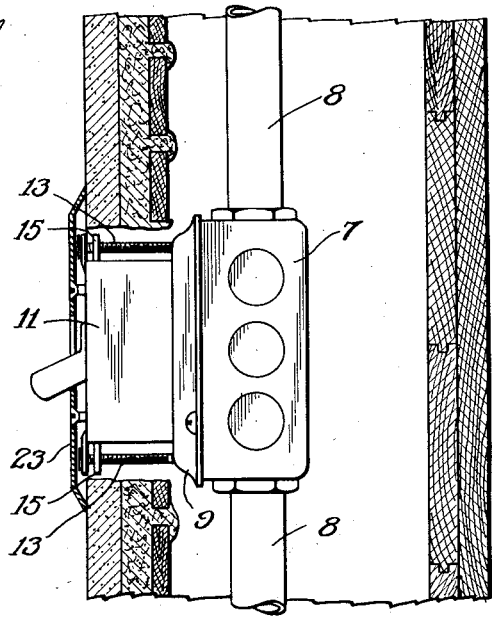
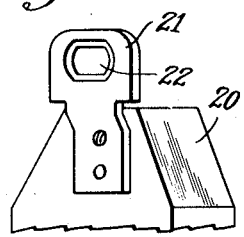
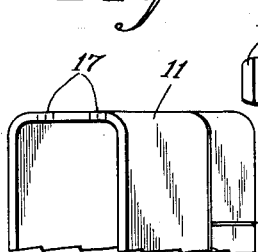
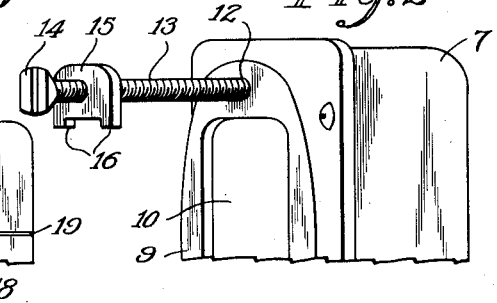
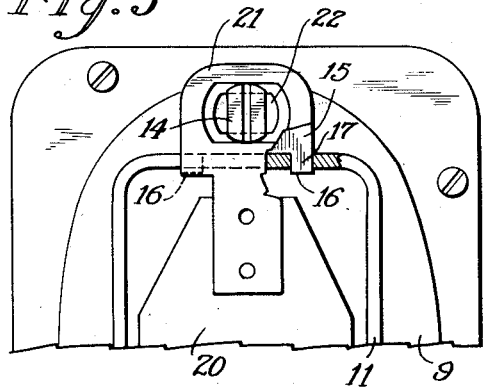
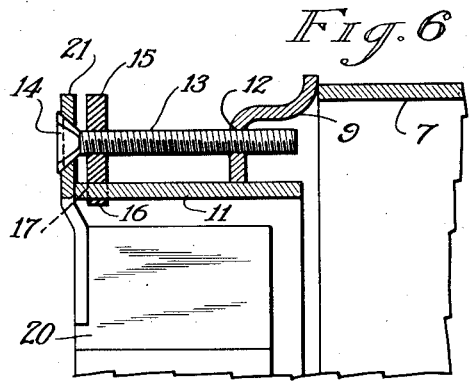
George Kranz
INVENTOR
BY Victor J. Evans & Co.
ATTORNEY Patented July 21, 1936

2,048,611

UNITED STATES PATENT OFFICE 2,048,611

ADJUSTABLE OUTLET BOX

George Kranz, St. Albans, N. Y., assignor of one-half to William J. Rickerby, Brooklyn, N. Y.

Application June 8, 1934, Serial No. 729,715

2 Claims. (Cl. 247—19)

This invention relates to electrical wiring installations and more particularly to the construction of switch or outlet conduit boxes, and also gem boxes.

The construction and installation of electrical wiring in buildings are prescribed and controlled by the National Board of Underwriters and Local Building Code Authorities, which organizations are especially critical concerning the installation of switch and outlet fixtures. Conduit boxes and connecting conduits are installed during the rough construction of a building and therefore their exact relation to a finish wall is indeterminate. It is on this point that the building inspectors place considerable importance inasmuch as any appreciable space existing between the edge of the opening of a conduit box and the surrounding structural material constitutes a fire hazard in that a spark occurring within a switch may ignite the surrounding combustible materials.

It is the object of my invention to provide a construction by which this inherent fire hazard will be eliminated by providing a device the installation of which permits the convenient adjustment of the exposed edge of a conduit box so that it will be flush with the finish surface of a wall or partition.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claims.

In describing the invention in detail and the particular physical embodiment illustrating the invention, reference is had to the accompanying drawing wherein like characters of reference designate corresponding parts thruout the several views.

In the drawing:

Fig. 1 is a vertical sectional view of the typical wall construction illustrating the installation of a complete conduit box and switch.

Fig. 2 is a perspective view of a conduit box with cover attached, Fig. 3 is a perspective view of an extension sleeve, and Fig. 4 is a perspective view of a typical switch unit, the three views being arranged to illustrate the order of installation.

Fig. 5 is a front elevational view of the sleeve adjusting means; and

Fig. 6 is a central sectional view of Fig. 5.

Referring to the drawing for a more detailed description thereof, numeral 7 indicates a standard form of conduit box to which is connected conduit 8. The box 7 is fitted with a cover 9, in which is cut an oblong opening 10 to receive an extension sleeve 11 and to permit same to be adjusted inwardly or outwardly of the box 7. A cover 9 is further provided with two tapped holes 12, one at each end thereof, which holes are adapted to receive an adjustment screw 13. The adjustment screw 13 has its head 14 formed similar to the usual flat head countersunk screw except that its sides are formed with parallel flat surfaces longitudinal with the body of the screw. An adjustment lug 15 is threadedly engaged with screw 13 and has one of its edges provided with tenons 16. The extension sleeve 11 has two holes 17 in each end thereof and proximal to the outer edge of the sleeve and adapted to receive tenons 16 so as to hold adjusting lug 15 substantially vertical to the end of sleeve 11. Extension sleeve 11 is further provided with undercuts 18 and 19 which facilitate the removal of any superfluous portion of the sleeve. That is to say, should the sleeve be installed with a major portion of its body extending into the box, this condition would prevent the proper connections to a switch or outlet and this superfluous portion may be torn off along the undercuts by grasping with pliers.

In Fig. 4 is illustrated a standard electrical unit 20, such as a switch or outlet receptacle, which is supplied with connecting lugs 21. These lugs and the holes 22 therein are manufactured to standard dimensions and therefore may be installed on any outlet box. Holes 22 are of oblong shape and countersunk. The head of screw 13 is of such size that connecting lug 21 may be slipped over same when head 14 is in alignment with hole 22, which head will engage the edges of hole 22 when the screw is turned 90°.

In the installation of electrical wiring conduits the entire roughing work is done during the construction of the building. Due to the rigidity of the connecting conduits 8 the position of outlet box 7 is fixed. Subsequent to the roughing in of the electrical work the finish plaster is installed and during this work holes are left in front of each outlet box. After the completion of the finish plaster coat, electrical switches and outlet receptacles are installed. It is at this time that the features of my invention are especially advantageous in that they provide a practical means for the positioning of the extension sleeve flush with the finish line of the plaster to effect a complete installation which will meet with the approval of the building inspectors. The installation of the switch and outlet units is as follows. Adjusting screws 13 having adjusting lugs threaded thereon are installed in their tapped holes in the cover of the outlet box so that the heads of screws 13 extend beyond the surface of the wall. Adjusting lugs 15 are then rotated on the screws until they are approximately in line with the surface of the wall. Extension sleeve 11 is then inserted into opening 10 of the box cover by spreading screws 13 a sufficient amount apart so that the tenons 16 of the adjusting lugs 15 clear the ends of the extension sleeve 11. The sleeve is pushed inward until the tenons 16 are engaged in the holes 17 of the sleeve 11. At this time the ends of the wires in the outlet box are brought out of the opening in the sleeve and are connected to the switch or receptacle unit. This unit is then pushed into the sleeve and the holes in the connecting lugs of the unit are passed over the heads of the adjusting screws 13, which are then tightened until the head of the screw grips the connecting lug 21, as shown clearly in Figs. 5 and 6. It is to be noted here that the position of adjusting lug 15 with relation to the finish line of the wall remains unchanged in that its engagement with the ends of sleeve 11 prevents its rotation. A switch or outlet plate 23 is then installed, which completes the entire installation.

What is claimed is:

1. An adjustable outlet box comprising a conduit box having an opening in the front thereof, a sleeve forwardly and rearwardly adjustable relative to said box and extending into said opening and forwardly of the front thereof, said sleeve having openings in opposing walls, an outlet receptacle unit, including apertured lugs, screws passing thru the apertures of said lugs and adjustably and threadedly engaging the front of the conduit box, and plates threadedly engaging said screws and having tenons extending into the openings of said sleeve, said plates being separate from the sleeve.

2. An adjustable outlet box comprising a conduit box having an opening in the front thereof, a sleeve forwardly and rearwardly adjustable relative to said box and extending into said opening and forwardly of the front thereof, said sleeve having openings in opposing walls, an outlet receptacle unit, including apertured lugs, screws passing thru the apertures of said lugs and adjustably and threadedly engaging the front of the conduit box, and plates threadedly engaging said screws and having tenons extending into the openings of said sleeve, said plates being separate from the sleeve, the openings in said lugs being of greater length than width and said screws having heads of greater length than width, the lengths of the screw heads being greater than the width of the openings in said lugs and the width of the screw heads being less than the width of the openings in said lugs, said plates being separate from the sleeve.

GEORGE KRANZ.